US011340123B2

(12) United States Patent
York

(10) Patent No.: US 11,340,123 B2
(45) Date of Patent: May 24, 2022

(54) ELECTROACTIVE POLYMER PRESSURE SENSOR HAVING CORRUGATING CAPACITOR

(71) Applicant: Parker-Hannifin Corporation, Cleveland, OH (US)

(72) Inventor: Alexander York, Eden Prarie, MN (US)

(73) Assignee: Parker-Hannifin Corporation, Cleveland, OH (US)

(*) Notice: Subject to any disclaimer, the term of this patent is extended or adjusted under 35 U.S.C. 154(b) by 0 days.

(21) Appl. No.: 16/902,986

(22) Filed: Jun. 16, 2020

(65) Prior Publication Data

US 2021/0048354 A1    Feb. 18, 2021

Related U.S. Application Data

(60) Provisional application No. 62/885,591, filed on Aug. 12, 2019.

(51) Int. Cl.
*G01L 1/14* (2006.01)
*G01L 5/00* (2006.01)

(52) U.S. Cl.
CPC ........... *G01L 1/142* (2013.01); *G01L 5/00* (2013.01)

(58) Field of Classification Search
CPC . H01G 4/01; H01G 4/22; G01L 1/146; G01L 1/165; G01L 5/0038
See application file for complete search history.

(56) References Cited

U.S. PATENT DOCUMENTS

| 4,266,263 | A | | 5/1981 | Haberl et al. | |
| 4,827,763 | A | | 5/1989 | Bourland et al. | |
| 5,447,076 | A | * | 9/1995 | Ziegler | G01L 1/142 73/862.625 |
| 5,693,886 | A | * | 12/1997 | Seimiya | G01L 1/142 73/718 |
| 5,886,615 | A | * | 3/1999 | Burgess | H01H 3/142 338/114 |
| 5,983,726 | A | | 11/1999 | Heller | |
| 6,376,971 | B1 | | 4/2002 | Pelrine et al. | |
| 6,647,795 | B2 | * | 11/2003 | Suzuki | G01L 1/144 73/718 |

(Continued)

OTHER PUBLICATIONS

Search Report for European Patent Application No. 20181333.4, dated Dec. 10, 2020, 8 pages.

(Continued)

*Primary Examiner* — Tran M. Tran
(74) *Attorney, Agent, or Firm* — McDonnell Boehnen Hulbert & Berghoff LLP

(57) ABSTRACT

An example pressure sensor is described. The pressure sensor includes a capacitor, a first of ridges formed on a first side of the capacitor, and a second set of ridges formed on a second side of the capacitor. The first set of ridges extends outward from the first side of the capacitor and defines a plurality of grooves. The second set of ridges extends outward from the second side of the capacitor. Ridges of the second set of ridges are aligned with grooves of the plurality of grooves such that, when a force is applied to the capacitor, the force increases a surface area of the capacitor by corrugating the capacitor along the first set of ridges and the second set of ridges.

20 Claims, 7 Drawing Sheets

(56) References Cited

U.S. PATENT DOCUMENTS

| | | | | |
|---|---|---|---|---|
| 7,395,717 | B2 * | 7/2008 | DeAngelis | H03K 17/9622 73/728 |
| 7,578,195 | B2 * | 8/2009 | DeAngelis | H03K 17/9622 73/718 |
| 7,880,371 | B2 | 2/2011 | Benslimane et al. | |
| 7,921,541 | B2 | 4/2011 | Pei et al. | |
| 7,923,064 | B2 | 4/2011 | Pelrine et al. | |
| 8,033,189 | B2 * | 10/2011 | Hayakawa | G01L 5/228 73/865.7 |
| 8,181,338 | B2 * | 5/2012 | Benslimane | H02N 1/006 29/846 |
| 8,393,229 | B2 * | 3/2013 | Tao | A43B 3/0005 73/862.046 |
| 8,451,011 | B2 * | 5/2013 | Hayakawa | G01L 1/142 324/658 |
| 8,950,265 | B2 | 2/2015 | Dunn et al. | |
| 8,997,588 | B2 * | 4/2015 | Taylor | G01L 1/00 73/862.044 |
| 9,261,395 | B2 | 2/2016 | Shearer et al. | |
| 9,274,010 | B2 * | 3/2016 | Maeda | G01L 1/144 |
| 9,581,629 | B2 * | 2/2017 | Zhu | G01N 27/24 |
| 9,823,141 | B2 * | 11/2017 | Li | G01L 1/146 |
| 9,841,331 | B2 | 12/2017 | Wood et al. | |
| 9,904,395 | B2 * | 2/2018 | Ogura | G01L 9/12 |
| 9,959,004 | B2 * | 5/2018 | Lang | G01L 5/0038 |
| 9,981,420 | B2 | 5/2018 | Benaissa et al. | |
| 10,045,740 | B2 | 8/2018 | John | |
| 10,591,367 | B2 * | 3/2020 | Jarvinen | G01D 5/2417 |
| 10,712,213 | B2 * | 7/2020 | Li | H01H 13/803 |
| 10,727,832 | B2 * | 7/2020 | Boese | H03K 17/975 |
| 10,912,198 | B2 * | 2/2021 | Kraemer | H05K 1/162 |
| 11,025,251 | B2 * | 6/2021 | Kraemer | H01L 41/08 |
| 2006/0042376 | A1 | 3/2006 | Reusche et al. | |
| 2011/0005325 | A1 | 1/2011 | Yang et al. | |
| 2013/0044049 | A1 | 2/2013 | Biggs et al. | |
| 2013/0047747 | A1 * | 2/2013 | Joung | G01L 1/142 73/862.68 |
| 2013/0134992 | A1 * | 5/2013 | Zhu | G01M 3/182 324/658 |
| 2014/0326079 | A1 * | 11/2014 | Maeda | G01L 1/142 73/862.626 |
| 2015/0107366 | A1 * | 4/2015 | Dunn | G01L 19/142 73/753 |
| 2015/0363023 | A1 | 12/2015 | Kawaguchi et al. | |
| 2018/0303383 | A1 | 10/2018 | Connor | |
| 2019/0131969 | A1 * | 5/2019 | Boese | G01L 1/142 |
| 2019/0229728 | A1 * | 7/2019 | Kraemer | H03K 17/964 |

OTHER PUBLICATIONS

Parker FlexSense Sensing Technology, Bulletin 3864—FlexSense, Jan. 2018.

* cited by examiner

ELECTROACTIVE POLYMER PRESSURE SENSOR HAVING CORRUGATING CAPACITOR

CROSS-REFERENCE TO RELATED APPLICATIONS

This disclosure claims priority to U.S. Provisional Patent App. No. 62/885,591, filed on Aug. 12, 2019, which is hereby incorporated by reference in its entirety.

FIELD

The present disclosure relates generally to pressure sensors, and more particularly, to pressure sensors for measuring a force applied to a surface.

BACKGROUND

Pressure sensors can act as transducers that generate an electrical signal as a function of the pressure imposed. Pressure sensors can be grouped into two basic categories. A first category of pressure sensors includes sensors that use a force collector to measure strain due to applied force over an area. These force collector types include capacitive pressure sensors, electromagnetic pressure sensors, and piezoelectric pressure sensors, for instance. A second category of pressure sensors includes sensors that use other properties to infer pressure of a gas or liquid. The second category of pressure sensors includes sensors that use density to infer pressure, such as resonant pressure sensors, thermal pressure sensors, and ionization pressure sensors.

SUMMARY

In one example, a pressure sensor is described. The pressure sensor includes a capacitor, a first of ridges formed on a first side of the capacitor, and a second set of ridges formed on a second side of the capacitor. The first set of ridges extends outward from the first side of the capacitor and defines a plurality of grooves. The second set of ridges extends outward from the second side of the capacitor. Ridges of the second set of ridges are aligned with grooves of the plurality of grooves such that, when a force is applied to the capacitor, the force increases a surface area of the capacitor by corrugating the capacitor along the first set of ridges and the second set of ridges.

In another example, a system for sensing pressure is described. The system includes a pressure sensor and a computing device. The pressure sensor includes a capacitor, a first set of ridges formed on a first side of the capacitor, and a second set of ridges formed on a second side of the capacitor. The first set of ridges extends outward from the first side of the capacitor and defines a plurality of grooves. The second set of ridges extends outward from the second side of the capacitor. Ridges of the second set of ridges are aligned with grooves of the plurality of grooves such that, when a force is applied to the capacitor, the force increases a surface area of the capacitor by corrugating the capacitor along the first set of ridges and the second set of ridges. The computing device is configured to determine a capacitance of the capacitor.

In another example, a method for sensing pressure is described. The method includes determining, using a computing device, a capacitance of a capacitor of a pressure sensor. The pressure sensor includes a first set of ridges formed on a first side of the capacitor and a second set of ridges formed on a second side of the capacitor. The first set of ridges extends outward from the first side of the capacitor and defines a plurality of grooves. The second set of ridges extends outward from the second side of the capacitor. Ridges of the second set of ridges are aligned with grooves of the plurality of grooves such that, when a force is applied to the capacitor, the force increases a surface area of the capacitor by corrugating the capacitor along the first set of ridges and the second set of ridges. The method also includes determining, based on the capacitance, a level of pressure applied to the pressure sensor.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying figures, wherein:

DETAILED DESCRIPTION

Figure 1:
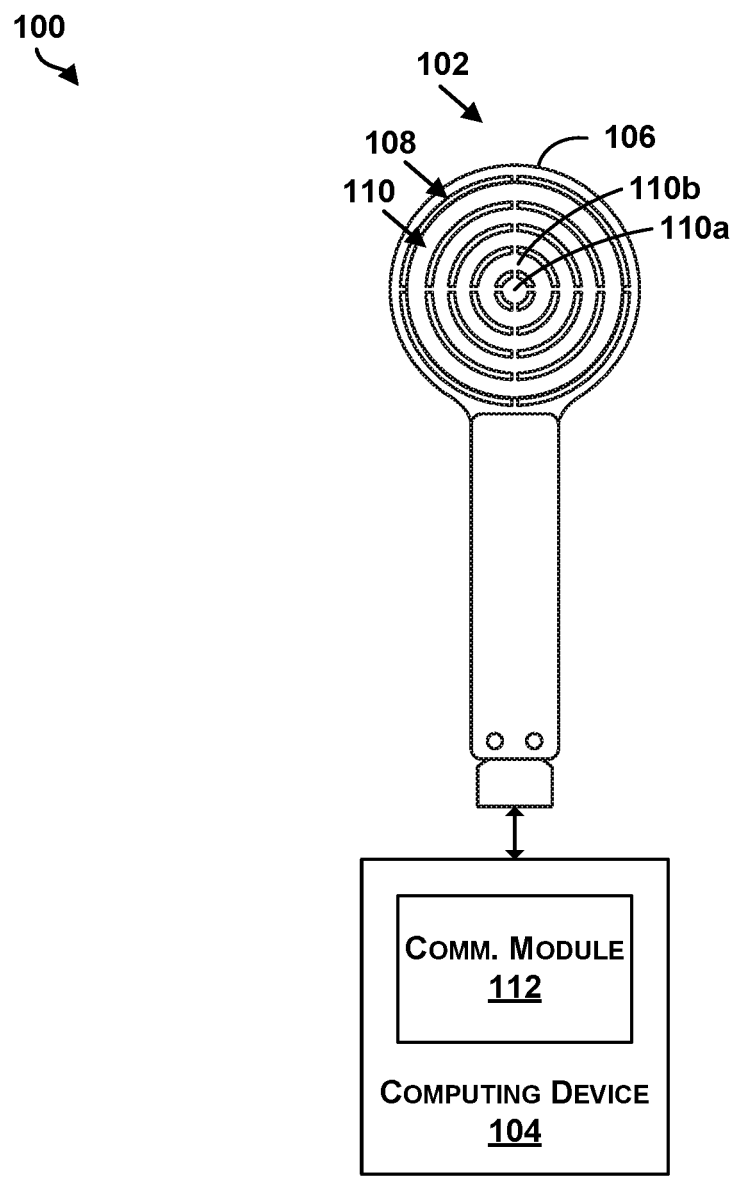
FIG. 1 illustrates an example system for sensing pressure, according to an example embodiment.

Disclosed examples will now be described more fully hereinafter with reference to the accompanying figures, in which some, but not all of the disclosed examples are shown. Indeed, several different examples may be provided and should not be construed as limited to the examples set forth herein. Rather, these examples are provided so that this disclosure will be thorough and complete and will fully convey the scope of the disclosure to those skilled in the art.

Described herein are low-profile pressure sensors that are configured for measuring force applied to a surface. An example pressure sensor can include a capacitor. The capacitor can include a multilayered capacitor including dielectric polymer material and conductive polymer material. Further, a top and bottom of the capacitor can include staggered, opposing ridges that allow the capacitor to fold into itself when a force is applied to the capacitor. For instance, a first side of the capacitor can include a first set of ridges that extends outward from the first side of the capacitor and defines a plurality of grooves. A second side of the capacitor can include a second set of ridges that extends outwards from the second side of the capacitor. Further, ridges of the second set of ridges can be aligned with grooves of the plurality of grooves such that, when a force is applied to the capacitor, the force increases surface area of the capacitor by corrugating the capacitor along the first set of ridges and the second set of ridges. For example, when a force is applied, the force can cause the first set of ridges and the second set of ridges to move closer to one another. In addition, the force can cause the capacitor to wrinkle and fold as the capacitor conforms to gaps between the first set of ridges and the second set of ridges.

As the surface area of the capacitor expands, the capacitance of the capacitor increases. A computing device that is conductively-coupled to the capacitor of the pressure sensor can therefore use the capacitance of the pressure sensor (or change in capacitance) to determine a level of pressure applied to the capacitor. For instance, the computing device can convert a measured capacitance to a level of pressure using calibration data.

Advantageously, for many applications, adding the first set of ridges and the second set of ridges can improve sensor performance by at least fifty percent greater output as compared to a pressure sensor that does not include ridges that are designed to corrugate the capacitor. The inclusion of the first set of ridges and the second set of ridges can increase the degree to which the surface area of the capacitor expands when a force is applied, thereby increasing the change in capacitance. As a result, the pressure sensor can be more sensitive and responsive to changes in pressure. In some examples, adding the first set of ridges and the second set of ridges can improve the output of the pressure sensor by approximately five times as compared to a pressure sensor that does not include ridges that are designed to corrugate the capacitor and expand the surface area of the capacitor.

Furthermore, the pressure sensor can be manufactured from materials that are soft, comfortable, and highly reliable. For instance, the pressure sensor can include a multilayered capacitor that includes insulating layers and conductive layers and has an elastic modulus that is less than 100 megapascals. With such a construction, the pressure sensor can bend and conform to a desired surface or shape. The pressure sensor may therefore be well-suited for wearable applications, such as for embedding within socks, shoes, insoles, gloves, or helmets. Alternatively, the pressure sensor can be embedded with grips for assessing a user's grip, such as in hand grips for testing grip strength or in a grip of a golf club.

Systems and methods making use of the described pressure sensors are also provided herein. An example system includes a computing device that can determine level of pressure based on a capacitance (or change in capacitance) of a capacitor of the pressure sensor. Optionally, the computing device can then wirelessly transmit data indicative of the level of pressure to another device. Various other features of the pressure sensors and associated systems and methods are also described hereinafter with reference to the accompanying figures.

Referring now to FIG. 1, an example system 100 for sensing pressure is illustrated. As shown in FIG. 1, the system 100 includes a pressure sensor 102 and a computing device 104.

In line with the discussion above, the pressure sensor 102 can include a capacitor 106, a first set of ridges 108 formed on a first side of the capacitor 106, and a second set of ridges (not shown in FIG. 1) formed on a second side of the capacitor 106. The first set of ridges 108 extends outward from the first side of the capacitor 106 and defines a plurality of grooves 110. Similarly, the second set of ridges can extend outward from a second side of the capacitor 106 and define another plurality of grooves.

The first set of ridges 108 can include a layer of material printed on the first side of the capacitor. For instance, the first set of ridges can include silicone ridges. In addition, the second set of ridges can include a layer of the same or a different material printed on the second side of the capacitor 106.

Ridges of the second set of ridges are aligned with grooves of the plurality of grooves. For example, a first ridge of the second set of ridges can be aligned with a first groove 110a of the first set of ridges 108 such that the first ridge fits within the first groove 110a when the first set or ridges and the second set of ridges are pressed together. Further, a second ridge of the second set of ridges can be aligned with a second groove 110b of the first set of ridges, and so forth.

In a similar manner, the second set of ridges can also define a plurality of grooves, and ridges of the first set of ridges can be aligned with grooves of the plurality of grooves defined by the second set of ridges. An example alignment of ridges and grooves is further described with reference to FIG. 2-4 below.

When a force is applied to the capacitor 106, the force increases a surface area of the capacitor by corrugating the capacitor along the first set of ridges 108 and the second set of ridges. For instance, a force applied to the top side of the capacitor 106 (i.e. into the page of FIG. 1) can compress the capacitor 106 as the pressure sensor 102 is squeezed against an object located beneath the pressure sensor. As the capacitor 106 compresses, a portion of the capacitor 106 can buckle outward (i.e. out of the page in FIG. 1) and fill in the grooves defined by the first set of ridges. Likewise, a portion of the capacitor 106 can buckle inward (i.e. into the page in FIG. 1) and fill in grooves of the plurality of grooves defined by the second set of ridges. This corrugation of the capacitor 106 increases a surface area of the capacitor 106. The increase in surface area, in turn, increases a capacitance of the capacitor 106.

Computing device 104 can include a processor and a non-transitory computer-readable medium storing program instructions that are executable by the processor to carry out any of the computing device functions described herein. The processor could be any type of processor, such as a microprocessor, digital signal processor, multicore processor, etc. Alternatively, the computing device 104 could include a group of processors that are configured to execute the program instructions, or multiple groups of processors that are configured to execute respective program instructions. The computing device 104 can also include a communication module 112 through which the computing device 104 is configured to communicate with one or more other devices. One or more components of computing device 104 can be provided on a printed circuit board.

The computing device 104 can be configured to determine a capacitance of the capacitor 106. In some examples, the capacitor 106 can include a parallel-plate capacitor having an insulating layer that is positioned between two conductive layers. A first conductive layer can be designated as a ground layer, and a second conductive layer can be designated as a positive layer. The ground layer can be connected to a first lead, and the positive layer can be connected to a second lead.

With this arrangement, the computing device 104 can measure capacitance by determining how long the capacitor takes to reach a set voltage level when a current is applied. For instance, the computing device 104 can apply a constant current to the capacitor 106, measure the voltage between the positive layer and the ground layer, and record the amount of time between when the current is applied and the when the capacitor reaches the set voltage level. The computing device 104 can then correlate the duration to a capacitance value. The duration can be on the order of a few microseconds, for instance. Therefore, the computing device 104 can quickly and repeatedly determine the capacitance of the capacitor, either on demand or on a fixed-interval basis. One of ordinary skill in the art will appreciate that other methods for measuring a capacitance of a parallel-plate capacitor can also be used.

The communication module 112 can be configured to transmit data over a wired or wireless communication link. Communication signals transmitted by the communication module 112 can include data indicative of a level of pressure applied to the pressure sensor 102. The data could include one or more capacitance measurements, from which the level of pressure can be derived.

The communication module 112 can be configured to communicate signals that comply with one or more wireless communication protocols, such as Wi-Fi, Bluetooth, Zigbee, Z-Wave etc. In one example, the communication module 112 can include an RF receiver and/or an RF transmitter. For instance, the communication module 112 can include an RF transceiver. The communication module 112 can also include one or more other components, such as an amplifier, mixer, filter, and/or microcontroller.

Figure 2:
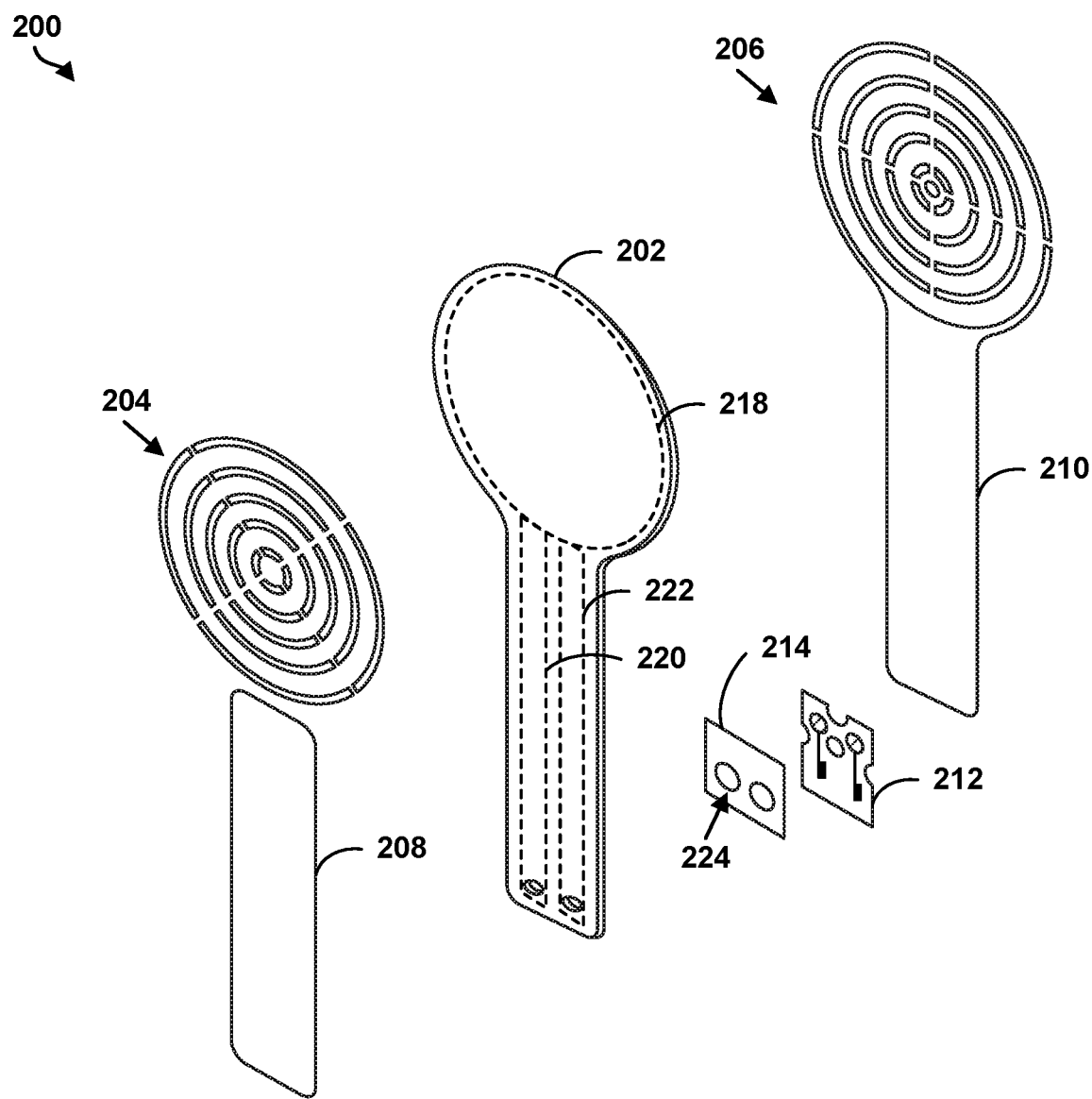
FIG. 2 is an exploded view of an example pressure sensor, according to an example embodiment.

FIG. 2 is an exploded view of an example pressure sensor 200, according to an example embodiment. Pressure sensor 200 could represent the pressure sensor 102 of FIG. 1, for example. As shown in FIG. 2, pressure sensor 200 includes a capacitor 202, a first set of ridges 204, a second set of ridges 206, a top cover 208, a bottom cover 210, an electrical connector 212, and a support member 214.

The capacitor 202 includes an outer layer 216, a parallel-plate stack 218, a first lead 220, and a second lead 222. The outer layer 216 can be formed of a relatively soft, insulating material, such as silicone. A thickness of the outer layer 216 can vary, depending on the desired rigidity or flexibility of the pressure sensor 200. For instance, the outer layer 216 can include a first dielectric outer layer and a second dielectric outer layer, and each of the first and second dielectric layers can range in thickness from 50 micrometers to 300 micrometers.

The parallel-plate stack 218 can include at least two conductive layers and at least one insulating layer that is positioned between the at least two conductive layers. Each sub-stack of conductive layer-insulating layer-conductive layer within the parallel-plate stack 218 can have material characteristics and electrical properties that are similar to a dielectric electroactive polymer. For instance, materials suitable for use as an insulating layer can include polymers or rubbers, such as a silicone, silicone elastomer, polyurethane, polyvinylidene fluoride copolymer, fluoroelastomer, or adhesive elastomer. Each insulating layer may have an elastic modulus that is less than 100 megapascals. The insulating layers may also deflect at linear strains in a range of about 40 to about 215 percent. Further, materials suitable for use as a conductive layer can include graphite, carbon black, colloidal suspensions, thin metals including silver and gold, or silver filled and carbon filled gels. An example conductive layer can include a combination of carbon grease and carbon black arranged within a silicone rubber binder. The conductive layers can also be capable of deflecting without comprising mechanical or electrical performance as the insulating layers stretch or bend. For instance, the conductive layers may deflect at linear strains of linear strains of at least 50 percent.

In one example, the parallel-plate stack 218 can include two insulating layers and three conductive layers. A first insulating layer can separate a first conductive layer and a second conductive layer, and a second insulating layer can separate the second conductive layer and a third conductive layer. Alternatively, the parallel-plate stack 218 can include three insulating layers and four conductive layers arranged in an alternating manner.

Given the characteristics of the outer layer 216 and of the component layers of the parallel-plate stack 218, the capacitor 200 can have an overall elastic modulus of less than 100 megapascals, and can be capable of deflecting with linear strains of at least fifty percent. In some examples, the capacitor 200 can be capable of deflecting with linear strains of about 200 percent.

The first lead 220 and the second lead 222 can conductively-couple conductive layers of the capacitor 202 to the electrical connector 212. For instance, at least one of the conductive layers of the parallel-plate stack 218 can be designated as a ground layer, and the first lead 220 can couple the ground layer(s) to the electrical connector 212. Further, at least one of the conductive layers of the parallel-plate stack 218 that is separated from a ground layer by an insulating layer can be designated as a positive layer, and the second lead 222 can couple the positive conductive layer(s) to the electrical connector 212.

As further shown in FIG. 2, the first set of ridges 204 is arranged as a first plurality of concentric ridges, and the second set of ridges 206 is arranged as a second plurality of concentric ridges that have a common center with the first plurality of concentric ridges. In other examples, the first set of ridges can be arranged in a different manner. For instance, the first set of ridges 108 can be arranged as a first row of ridges, with the second set of ridges arranged as a second row of ridges that are aligned with grooves defined by the first row of ridges.

The top cover 208 and the bottom cover 210 can be formed of a relatively soft, insulating material, such as silicone. The top cover 208 and the bottom cover 210 can function as an outer layer for the pressure sensor 200, and can help to protect the internal components of the pressure sensor from damage or contaminants.

The electrical connector 212 can be used for coupling the pressure sensor 200 to a computing device, such as the computing device 104 of FIG. 1. For instance, the electrical connector 212 can be a flex printed circuit board or rigid-flex printed circuit board.

The support member 214 can be a layer of material that reinforces the electrical connector 212 at a location where the electrical connector is connected to the first lead 220 and the second lead 222 of the capacitor 202. For instance, the support member 214 can include a layer of heat-cured silicone. Holes 224 within the support member 214 can be filled with a conductive material, such as silver, in order to provide electrical connections between the first lead 220 and the electrical connector 212 and between the second lead 222 and the electrical connector 212.

The pressure sensor 200 can have a low profile that allows for embedding the pressure sensor within various for objects. For instance, the pressure sensor 200 can have an overall thickness of less than 2 millimeters, such as 1.25 millimeters or 1.5 millimeters.

Figure 3:
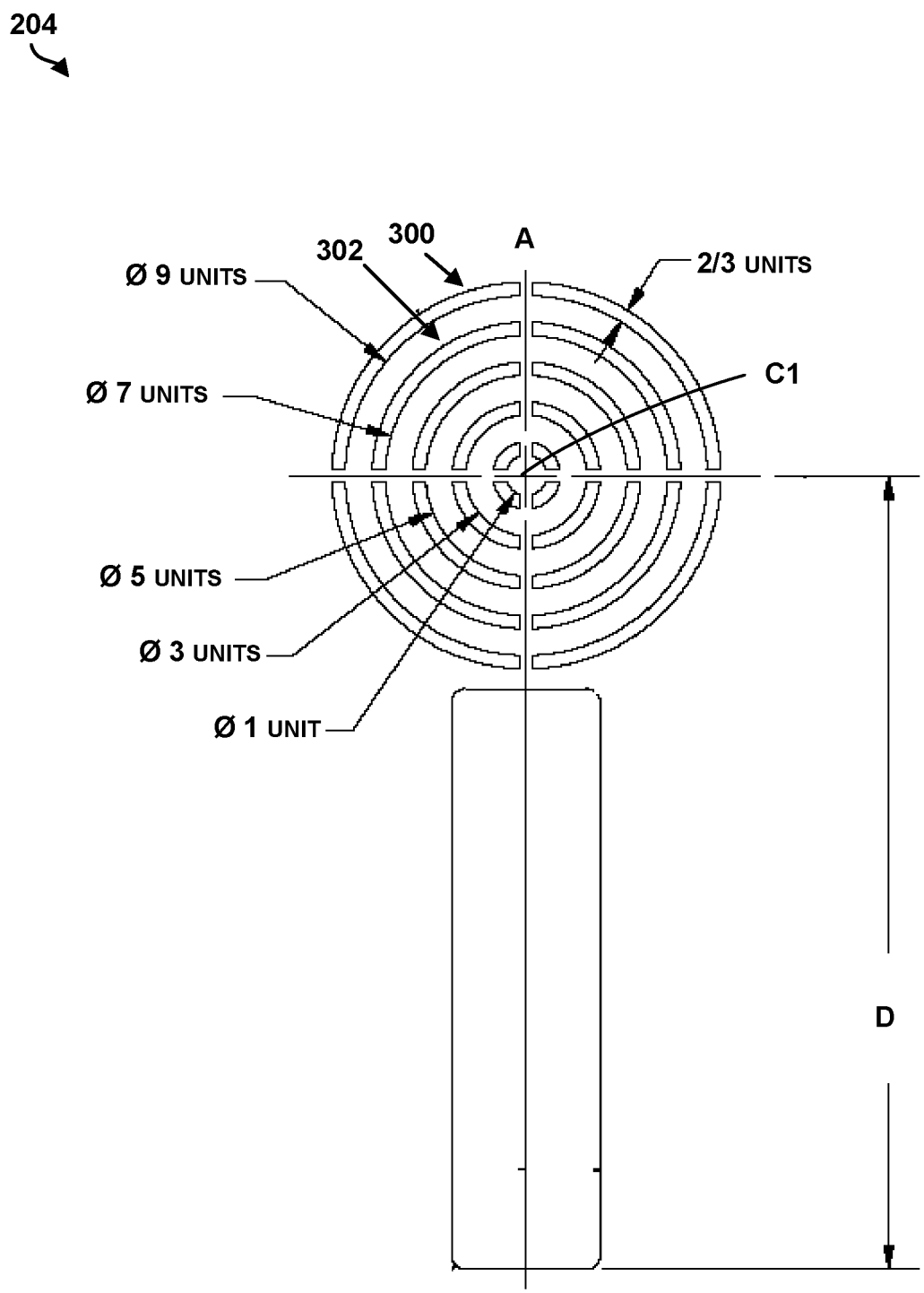
FIG. 3 illustrates the first set of ridges of the pressure sensor shown in FIG. 2.

FIG. 3 illustrates the first set of ridges 204 of the pressure sensor 200 shown in FIG. 2. As shown in FIG. 3, the first set of ridges 204 includes a first plurality of concentric ridges 300 that are centered at a center position C1. The center position C1 is offset from an end of the pressure sensor by a distance D and aligned with a longitudinal axis A of the pressure sensor.

Each concentric ridge of the first plurality of concentric ridges 300 is a ring-shaped ridge having a width of two-thirds units. The length of one unit could vary depending on the desired implementation. For instance, one unit could correspond to one millimeter, two millimeters, three millimeters, etc.

Further, each concentric ridge has an inner diameter and an outer diameter. In particular, a first concentric ridge has an inner diameter of one unit and an outer diameter of one and two-thirds units, a second concentric ridge has an inner diameter of three units and an outer diameter of three and two-thirds units, a third concentric ridge has an inner diameter of five units and an outer diameter of five and two-thirds units, a fourth concentric ridge has an inner diameter of seven units and an outer diameter of seven and two-thirds units, and a fifth concentric ridge has an inner diameter of nine units and an outer diameter of nine and two-thirds units.

With the spacing shown in FIG. 3, the first plurality of concentric ridges 300 defines a first plurality of grooves 302. The first plurality of grooves 302 include a circle having a diameter of one unit, as well as four ring-shaped grooves having a width of four-thirds units.

Figure 4:
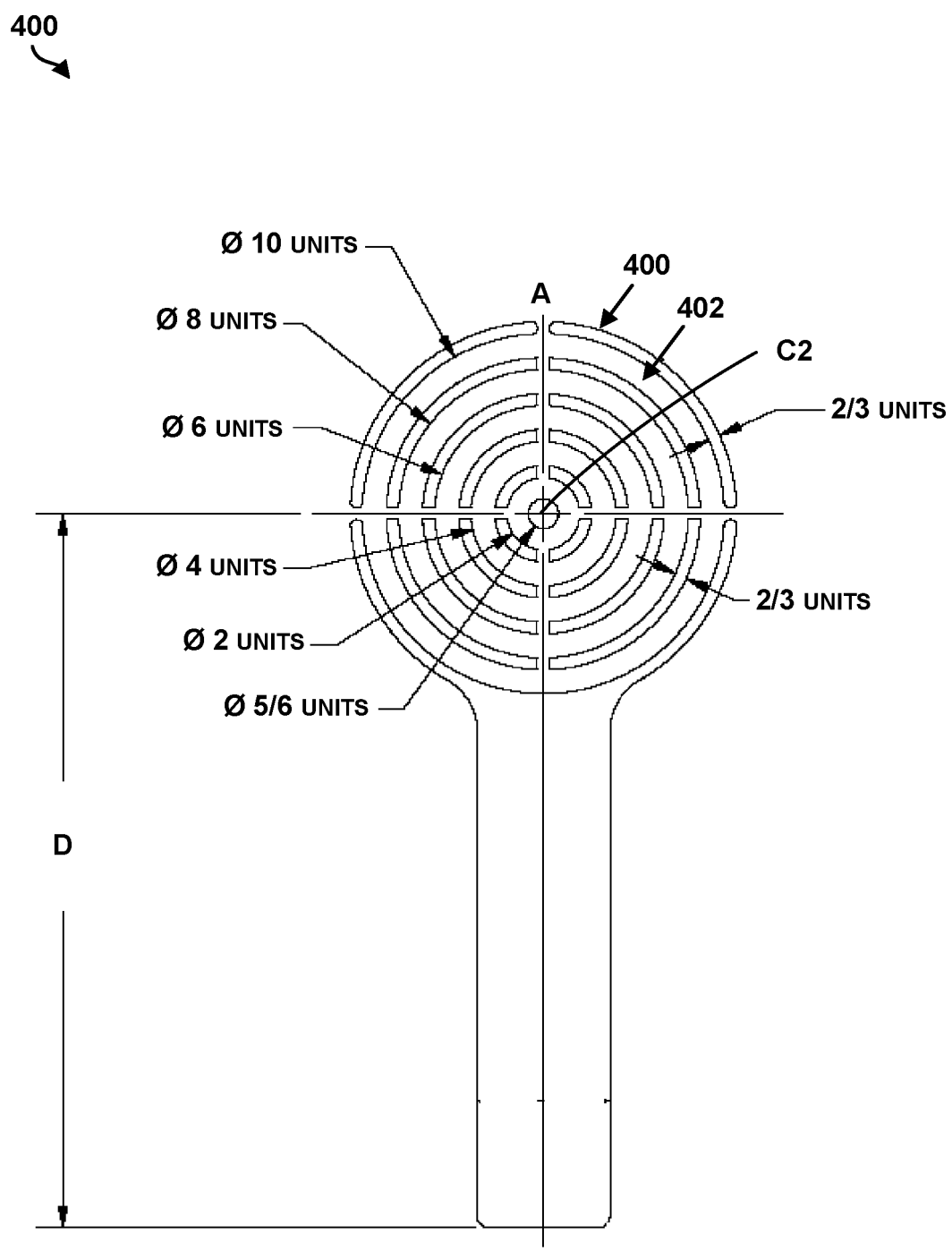
FIG. 4 illustrates the second set of ridges of the pressure sensor shown in FIG. 2.

FIG. 4 illustrates the second set of ridges 206 of the pressure sensor 200 shown in FIG. 2. As shown in FIG. 4, the second set of ridges 206 includes a second plurality of concentric ridges 400 that are centered at a center position C2. Like the center position C1 shown in FIG. 3, the center position C2 is offset from an end of the pressure sensor by a distance D and aligned with a longitudinal axis A of the pressure sensor. Hence, the first plurality of concentric ridges 300 and the second plurality of concentric ridges 400 have a common center.

The second plurality of concentric ridges 400 includes a circular-shaped ridge and five ring-shaped ridges. The circular-shaped ridge has a diameter of five-sixths units. Each ring-shaped ridge has a width of two-thirds units. Further, each ring-shaped ridged has an inner diameter and an outer diameter. In particular, a first ring-shaped ridge has an inner diameter of two units and an outer diameter of two and two-thirds units, a second ring-shaped ridge has an inner diameter of four units and an outer diameter of four and two-thirds units, a third ring-shaped ridge has an inner diameter of six units and an outer diameter of six and two-thirds units, a fourth ring-shaped ridge has an inner diameter of eight units and an outer diameter of eight and two-thirds units, and a fifth ring-shaped ridge has an inner diameter of ten units and an outer diameter of ten and two-thirds units.

With the spacing shown in FIG. 4, the second plurality of concentric ridges 400 defines a second plurality of grooves 402. The first plurality of grooves 302 include a first, smallest ring-shaped groove having a width of seven-sixth units, and four ring-shaped grooves having a width of four-thirds units.

The numbers, dimensions, and spacing of the first plurality of concentric ridges 300 and the second plurality of concentric ridges 400 shown in FIGS. 3 and 4 are provided by way of example and not meant to be limiting. One of ordinary skill in the art will appreciate that the dimensions and spacing can be adjusted according to the desired application and performance. For instance, in another embodiment, the first set of ridges 204 can include just two concentric ridges and the second set of ridges 206 can include just one ridge, with the first set of ridges 204 and the second set of ridges 206 arranged such that the capacitor 202 is corrugated when pressure is applied.

Comparing FIGS. 3 and 4 shows that ridges of the first plurality of concentric ridges 300 are aligned with grooves of the second plurality of grooves 402. For instance, when the first plurality of concentric ridges 300 and the second plurality of concentric ridges 400 are pressed together, ridges of the first plurality of concentric ridges 300 fit within respective grooves of the second plurality of grooves 402. In addition, the grooves of the second plurality of grooves 402 are wider than the ridges of the first plurality of concentric ridges 300. Since the grooves of the second plurality of grooves 402 are wider than the ridges of the first plurality of concentric ridges 300, the capacitor 202 can expand and fill in gaps between the grooves of the second plurality of grooves 402 and ridges of the first plurality of concentric ridges 300 when a force presses the pressure sensor 200 against a surface.

Similarly, ridges of the second plurality of concentric ridges 400 are aligned with grooves of the first plurality of grooves 302. In addition, the grooves of the first plurality of grooves 302 are wider than the ridges of the second plurality of concentric ridges 400. Since the grooves of the first plurality of grooves 302 are wider than the ridges of the second plurality of concentric ridges 400, the capacitor 202 can expand and fill in gaps between the grooves of the first plurality of grooves 302 and ridges of the second plurality of concentric ridges 400 when a force presses the pressure sensor 200 against a surface.

Furthermore, a first concentric ridge of the first plurality of concentric ridges has a smallest inner diameter (i.e. one unit) among concentric ridges of the first plurality of concentric ridges 300, a second concentric ridge of the second plurality of concentric ridges 400 has a smallest outer diameter (i.e. five-sixths units) among concentric ridges of the second plurality of concentric ridges 400, and the outer diameter of the second concentric ridge is less than the inner diameter of the first concentric ridge. In other words, the second concentric ridge can fit within the first concentric ridge when the first plurality of concentric ridges 300 and the second plurality of concentric ridges 400 are pressed towards one another.

Figure 5:
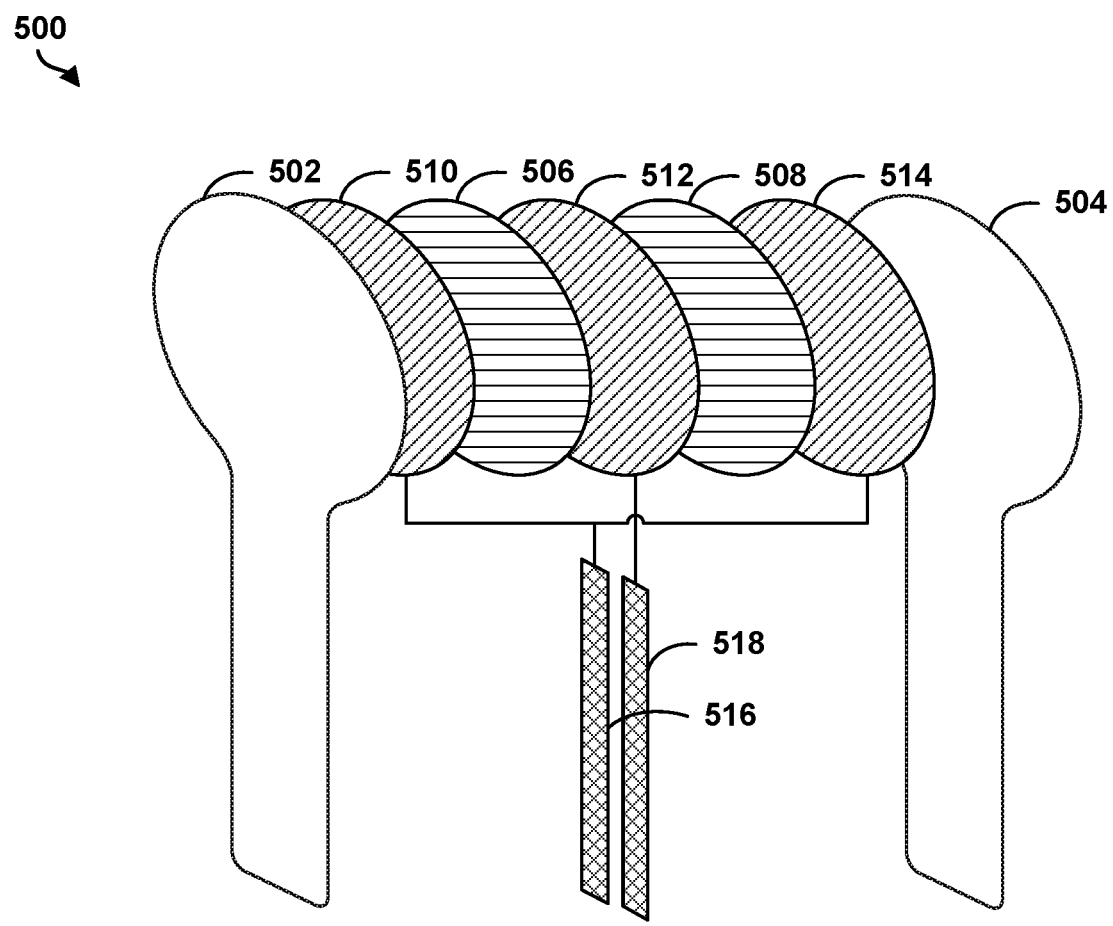
FIG. 5 illustrates an exploded view of an example capacitor, according to an example embodiment.

FIG. 5 illustrates an exploded view of an example capacitor 500, according to an example embodiment. Capacitor 500 could represent the capacitor 202 of FIG. 2, for example. As shown in FIG. 5, capacitor 500 includes a first dielectric outer layer 502, a second dielectric outer layer 504, a first dielectric inner layer 506, a second dielectric inner layer 508, a first conductive layer 510, a second conductive layer 512, a third conductive layer 514, a first lead 516, and a second lead 518.

The first conductive layer 510 is positioned between the first dielectric outer layer 502 and the first dielectric inner layer 506. Further, the second conductive layer 512 is positioned between the first dielectric inner layer 506 and the second dielectric inner layer 508. Still further, the third conductive layer 514 is positioned between the second dielectric inner layer 508 and the second dielectric outer layer 504. With this arrangement, the first conductive layer 510 and the second conductive layer 512 can function as a first active capacitor, with the first conductive layer 510 designated as a ground layer and the second conductive layer 512 designated as a positive layer. Similarly, the second conductive layer 512 and the third conductive layer 514 can function as a second active capacitor, with the second conductive layer 512 designated as a positive layer and the third conductive layer 514 designated as a ground layer.

To facilitate measuring the capacitance of the capacitor 500, the first conductive layer 510 and the third conductive layer 514 that are designated as ground layers are conductively-coupled to the first lead 516. Whereas, the second conductive layer 512 that is designated as the positive layer is conductively-coupled to the second lead 518. Other capacitors can be created with more less active capacitors by varying the number of ground-insulator-positive stacks within the capacitor 500.

As indicated by the fill patterns shown in FIG. 5, the first dielectric outer layer 502 and the second dielectric outer layer 504 can be the same insulating material or similar insulating materials. The thicknesses of these dielectric outer layers can vary depending on the desired thickness and rigidity of a pressure sensor that incorporates the capacitor 500. For instance, the thicknesses of these dielectric outer layers can range from about 50 micrometers to 300 micrometers. The thicknesses of these dielectric outer layers could also be greater than 300 micrometers in some examples.

The first dielectric inner layer 506 and the second dielectric inner layer 508 can also be the same insulating material or similar insulating materials. The thicknesses of these dielectric inner layers can vary depending on the desired electric properties of the capacitor 500. Increasing the thicknesses of these dielectric inner layers can increase the capacitance of the capacitor 500. Conversely, decreasing the thicknesses of these dielectric inner layers can decrease the capacitance of the capacitor 500. In some examples, the thicknesses of these dielectric inner layers can range from about 50 micrometers to 250 micrometers.

Since the thicknesses of the dielectric inner layers could differ from the thicknesses of the dielectric outer layers, the dielectric inner layers are shown with different fill patterns than the dielectric outer layers. However, in some examples, the dielectric inner layers and the dielectric outer layers can all be the same material, such as silicone, for instance.

Each of the first conductive layer 510, the second conductive layer 512, and the third conductive layer 514 can include electrodes of any shape and conductive material(s). Hence, although these conductive layers are shown as circular in FIG. 5, the example is not meant to be limiting. In one example, each of these conductive layers can include conductive traces overlaying a charge distribution layer. The charge distribution layer can facilitate distribution of charge between the conductive traces. The conductive traces could be arranged as parallel lines, for example, or in another suitable manner. Further, each of these conductive layers can range in thickness from about 10 micrometers to about 50 micrometers.

Figure 6:
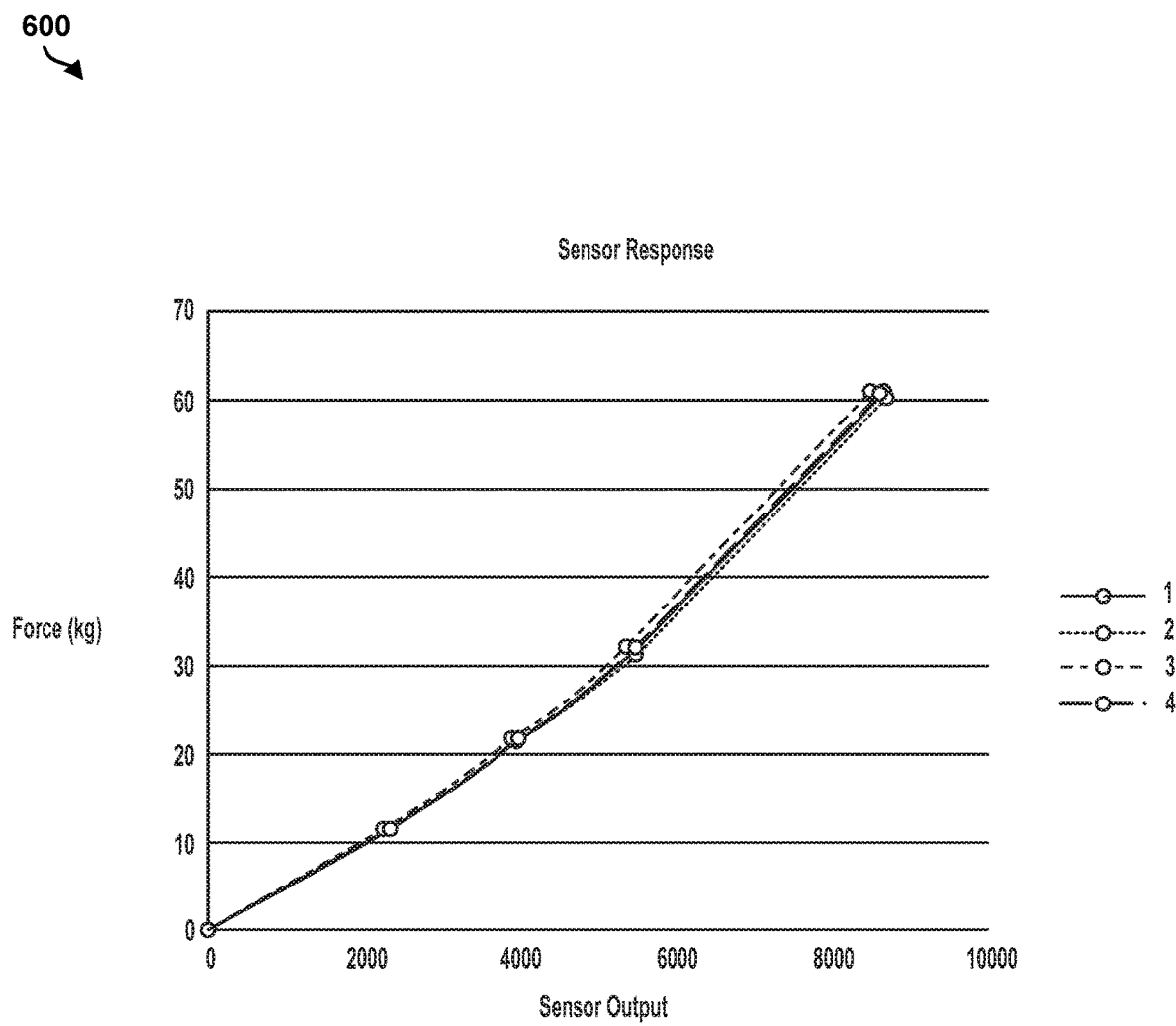
FIG. 6 is a graph showing example response curves of pressure sensors, according to an example embodiment.

FIG. 6 is a graph 600 showing example response curves of pressure sensors, according to an example embodiment. Sensor values were measured for four different pressure sensors. Consistent with the pressure sensors described herein, each of the pressure sensors included a capacitor, a first plurality of ridges that extends outward from a first side of the capacitor, and a second plurality of ridges that extends outward from a second side of the capacitor. As shown in FIG. 6, for each of four different pressure sensors, the sensor output increased as the applied force increased. Thus, the sensor output can be used to infer a level of force. Alternatively, the sensor output of a pressure sensor and the area of the pressure sensor can be used to infer a level of pressure.

Figure 7:
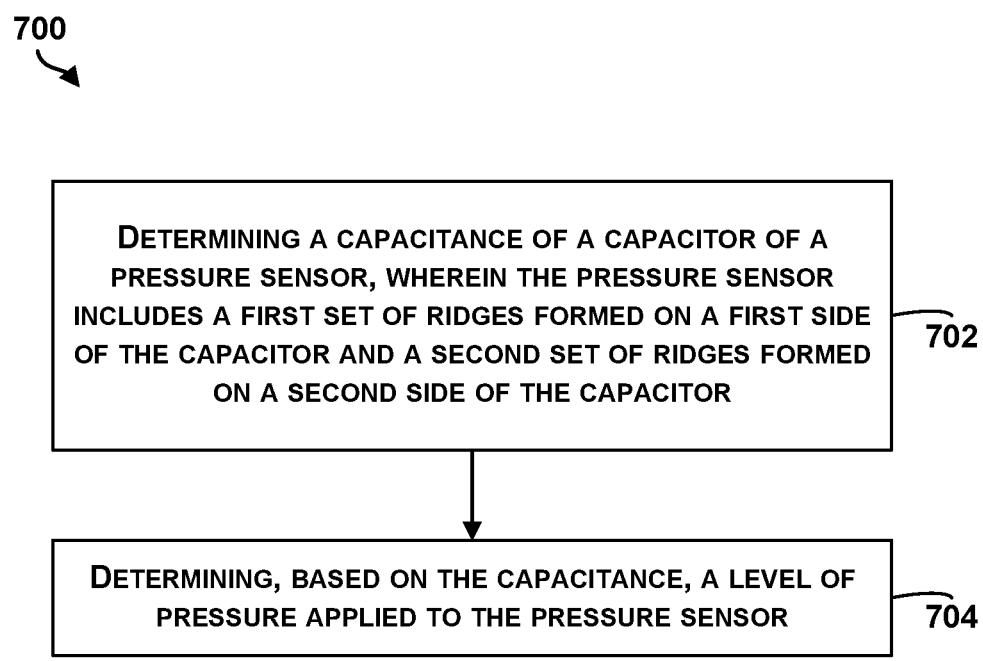
FIG. 7 is a flow chart of an example method for sensing pressure, according to an example embodiment.

FIG. 7 is a flow chart of an example method for sensing pressure, according to an example embodiment. Method 700 shown in FIG. 7 presents an example of a method that, for example, could be used with system 100 of FIG. 1, for example, or any of the systems disclosed herein. Blocks 702 and 704 can be carried out by a computing device, such as the computing device 104 of FIG. 1.

Method 700 can include one or more operations, functions, or actions as illustrated by one or more of blocks 702 and 704. The various blocks may be combined into fewer blocks, divided into additional blocks, and/or removed based upon the desired implementation. One or more of blocks 702 and 704 can represent a module, segment, or a portion of program code, which includes one or more instructions executable by a processor for implementing specific logical functions or steps in the process.

For this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved.

Initially, at block 702, the method 700 includes determining a capacitance of a capacitor of a pressure sensor, with the pressure sensor including a first set of ridges formed on a first of the capacitor and a second set of ridges formed on a second side of the capacitor. The first set of ridges extends outward from the first side of the capacitor and defines a plurality of grooves. The second set of ridges extends outward from the second side of the capacitor. In addition, ridges of the second set of ridges are aligned with grooves of the plurality of grooves such that, when a pressure force is applied to the capacitor, the force increases a surface area of the capacitor by corrugating the capacitor along the first set of ridges and the second set of ridges.

In line with the discussion above, determining the capacitance can include determining how long the capacitor takes to reach a set voltage level when a current is applied. For instance, the computing device can apply a constant current to the capacitor, measure the voltage between the one or more ground layers and the one or more positive layers, and record the amount of time between when the current is applied and the when the capacitor reaches the set voltage level. The computing device can then correlate the duration to a capacitance value. The duration can be on the order of a few microseconds, for instance. One of ordinary skill in the art will appreciate that other methods for measuring a capacitance of a parallel-plate capacitor can also be used.

Further, at block 704, the method 700 includes determining, based on the capacitance, a level of pressure applied to the pressure sensor. For instance, the computing device can convert the capacitance to the level of pressure using calibration data. The calibration data can be derived by determining sensor output values of the pressure sensor for varying known amounts of applied force. The calibration data can include data similar to the response curves shown in FIG. 6, for instance.

The systems and methods described herein can be integrated into a variety of useful systems. As one example, any of the pressure sensors or systems described herein can be embedded into an article of footwear, such as the insole of a shoe for pressure mapping. The pressure mapping can be used for athletic purposes or medical purposes, for example. Alternatively, the can be embedded into a sock. Data from one or more pressure sensors within a sock can then be analyzed to help identify areas where a user applies more or less pressure when walking, running, biking, etc.

As another example, any of the pressure sensors or systems described herein can be embedded into a device that a user squeezes to assess grip strength. For example, one or more pressure sensors can be embedded within a hand grip, and the pressure sensors can gather pressure data as a user (e.g., a stroke survivor or other medical patient) grips the hand grip.

As still another example, any of the pressure sensors or systems described herein can be embedded within a grip of a golf club and used to analyze a user's grip strength or position while swinging the golf club. In other examples, any of the pressure sensors or systems described herein can be embedded within a helmet (e.g., a football helmet or hockey helmet) in order to assess impact pressure during a sporting event. Alternatively, any of the pressure sensors or systems described herein can be embedded within a scale in order to weigh an object. Other examples are also possible.

The description of the different advantageous arrangements has been presented for purposes of illustration and description, and is not intended to be exhaustive or limited to the examples in the form disclosed. After reviewing and understanding the foregoing disclosure, many modifications and variations will be apparent to those of ordinary skill in the art. Further, different examples may provide different advantages as compared to other examples. The example or examples selected are chosen and described in order to best explain the principles, the practical application, and to enable others of ordinary skill in the art to understand the disclosure for various examples with various modifications as are suited to the particular use contemplated.

What is claimed is:

1. A pressure sensor comprising:
a multilayered capacitor comprising a first dielectric outer layer, a second dielectric outer layer, and a first conductive layer positioned between the first dielectric outer layer and the second dielectric outer layer, wherein the first dielectric outer layer has an inner side that faces the first conductive layer and an outer side that is opposite to the inner side, and wherein the second dielectric outer layer has an inner side that faces the first conductive layer and an outer side that is opposite to the inner side;
a first set of silicone ridges printed on the outer side of the first dielectric outer layer of the multilayered capacitor, the first set of silicone ridges extending outward from the outer side of the first dielectric outer layer of the multilayered capacitor and defining a plurality of grooves; and
a second set of silicone ridges printed on the outer side of the second dielectric outer layer of the multilayered capacitor, wherein the second set of silicone ridges extends outward from the outer side of the second dielectric outer layer of the multilayered capacitor, and wherein ridges of the second set of silicone ridges are aligned with grooves of the plurality of grooves such that, when a force is applied to the multilayered capacitor, the force increases a surface area of the multilayered capacitor by corrugating the multilayered capacitor along the first set of silicone ridges and the second set of silicone ridges.

2. The pressure sensor of claim 1, wherein the first set of silicone ridges comprises a first plurality of concentric ridges, and wherein the second set of silicone ridges comprises a second plurality of concentric ridges having a common center with the first plurality of concentric ridges.

3. The pressure sensor of claim 2, wherein a first concentric ridge of the first plurality of concentric ridges has a smallest inner diameter among concentric ridges of the first plurality of concentric ridges, wherein a second concentric ridge of the second plurality of concentric ridges has a smallest outer diameter among concentric ridges of the second plurality of concentric ridges, and wherein the outer diameter of the second concentric ridge is less than the inner diameter of the first concentric ridge.

4. The pressure sensor of claim 1, wherein the first set of silicone ridges comprises a first row of ridges, and wherein the second set of silicone ridges comprises a second row of ridges.

5. The pressure sensor of claim 1, wherein the multilayered capacitor further comprises a second conductive layer and a third conductive layer, wherein the first conductive layer and the third conductive layer are conductively-coupled together and to a first lead, wherein the second conductive layer is conductively-coupled to a second lead, wherein the pressure sensor further comprises an electrical connector for coupling the first lead and the second lead to a computing device.

6. The pressure sensor of claim 1, wherein the multilayered capacitor has an elastic modulus that is less than 100 megapascals.

7. The pressure sensor of claim 1, wherein an overall thickness of the pressure sensor is less than 2 millimeters.

8. A pressure sensor comprising:
a multilayered capacitor comprising a first dielectric outer layer, a second dielectric outer layer, and a first conductive layer positioned between the first dielectric outer layer and the second dielectric outer layer, wherein the first dielectric outer layer has an inner side that faces the first conductive layer and an outer side that is opposite to the inner side, and wherein the second dielectric outer layer has an inner side that faces the first conductive layer and an outer side that is opposite to the inner side;
a first set of ridges formed on the outer side of the first dielectric outer layer of the multilayered capacitor, the first set of ridges extending outward from the outer side of the first dielectric outer layer of the multilayered capacitor and defining a plurality of grooves; and
a second set of ridges formed on the outer side of the second dielectric outer layer of the multilayered capacitor, wherein the second set of ridges extends outward from the outer side of the second dielectric outer layer of the multilayered capacitor, and wherein ridges of the second set of ridges are aligned with grooves of the plurality of grooves such that, when a force is applied to the multilayered capacitor, the force increases a surface area of the multilayered capacitor by corrugating the multilayered capacitor along the first set of ridges and the second set of ridges,
wherein the multilayered capacitor further comprises a second conductive layer and a third conductive layer,
wherein the first conductive layer and the third conductive layer are conductively-coupled together and to a first lead,
wherein the second conductive layer is conductively-coupled to a second lead,
wherein the pressure sensor further comprises an electrical connector for coupling the first lead and the second lead to a computing device,
wherein the multilayered capacitor further comprises a first dielectric inner layer and a second dielectric inner layer, wherein the second conductive layer is positioned between the second dielectric outer layer and the second dielectric inner layer, and wherein the third conductive layer is positioned between the first dielectric inner layer and the second dielectric inner layer.

9. The pressure sensor of claim 8, wherein the first set of ridges comprises a first plurality of concentric ridges, and wherein the second set of ridges comprises a second plurality of concentric ridges having a common center with the first plurality of concentric ridges.

10. A system for sensing pressure, the system comprising:
a pressure sensor comprising:
   a multilayered capacitor comprising a first dielectric outer layer, a second dielectric outer layer, and a first conductive layer positioned between the first dielectric outer layer and the second dielectric outer layer, wherein the first dielectric outer layer has an inner side that faces the first conductive layer and an outer side that is opposite to the inner side, and wherein the second dielectric outer layer has an inner side that faces the first conductive layer and an outer side that is opposite to the inner side,
   a first set of ridges formed on the outer side of the first dielectric outer layer of the multilayered capacitor, the first set of ridges extending outward from the outer side of the first dielectric outer layer of the multilayered capacitor and defining a plurality of grooves, and
   a second set of ridges formed on the outer side of the second dielectric outer layer of the multilayered capacitor, wherein the second set of ridges extends outward from the outer side of the second dielectric outer layer of the multilayered capacitor, and wherein ridges of the second set of ridges are aligned with grooves of the plurality of grooves such that, when a force is applied to the multilayered capacitor, the force increases a surface area of the multilayered capacitor by corrugating the multilayered capacitor along the first set of ridges and the second set of ridges; and
a computing device conductively-coupled to the multilayered capacitor, wherein the computing device is configured to determine a capacitance of the multilayered capacitor.

11. The system of claim 10, wherein the first set of ridges comprises a first plurality of concentric ridges, and wherein the second set of ridges comprises a second plurality of concentric ridges having a common center with the first plurality of concentric ridges.

12. The system of claim 10, wherein the first set of ridges comprises a first row of ridges, and wherein the second set of ridges comprises a second row of ridges.

13. The system of claim 10, wherein the multilayered capacitor further comprises a second conductive layer and a third conductive layer, wherein the first conductive layer and the third conductive layer are conductively-coupled together and to a first lead, wherein the second conductive layer is conductively-coupled to a second lead, and wherein the pressure sensor further comprises an electrical connector for coupling the first lead and the second lead to the computing device.

14. The system of claim 10, wherein the multilayered capacitor has an elastic modulus that is less than 100 megapascals.

15. The system of claim 10, further comprising a communication module configured to transmit data indicative of the capacitance.

16. The system of claim 10, further comprising an insole of an article of footwear, wherein the pressure sensor is embedded in the insole.

17. The system of claim 10, further comprising a sock, wherein the pressure sensor is embedded in the sock.

18. The system of claim 10, further comprising a hand grip, wherein the pressure sensor is embedded in the hand grip.

19. A method for sensing pressure, the method comprising:
determining, using a computing device, a capacitance of a multilayered capacitor of a pressure sensor, wherein the multilayered capacitor comprises a first dielectric outer layer, a second dielectric outer layer, and a first conductive layer positioned between the first dielectric outer layer and the second dielectric outer layer, wherein the first dielectric outer layer has an inner side that faces the first conductive layer and an outer side that is opposite to the inner side, and wherein the second dielectric outer layer has an inner side that faces the first conductive layer and an outer side that is opposite to the inner side, and wherein the pressure sensor comprises:
   a first set of ridges formed on the outer side of the first dielectric outer layer of the multilayered capacitor, the first set of ridges extending outward from the outer side of the first dielectric outer layer of the multilayered capacitor and defining a plurality of grooves, and
   a second set of ridges formed on the outer side of the second dielectric outer layer of the multilayered capacitor, wherein the second set of ridges extends outward from the outer side of the second dielectric outer layer of the multilayered capacitor, and wherein ridges of the second set of ridges are aligned with grooves of the plurality of grooves such that, when a force is applied to the multilayered capacitor, the force increases a surface area of the multilayered capacitor by corrugating the multilayered capacitor along the first set of ridges and the second set of ridges; and
determining, based on the capacitance, a level of pressure applied to the pressure sensor.

20. The method of claim 19, wherein determining the level of pressure comprises converting the capacitance to the level of pressure using calibration data for the pressure sensor.

* * * * *